United States Patent [19]
Ratley

[11] Patent Number: 5,541,364
[45] Date of Patent: Jul. 30, 1996

[54] WIREWAY

[75] Inventor: Patrick L. Ratley, Indianapolis, Ind.

[73] Assignee: Illinois Tool Works Inc., Glenview, Ill.

[21] Appl. No.: 318,344

[22] Filed: Oct. 5, 1994

[51] Int. Cl.[6] .................................................. H02G 3/04
[52] U.S. Cl. .......................... 174/65 R; 174/68.1; 174/95; 220/633
[58] Field of Search ............................ 174/70 R, DIG. 2, 174/68.1, 95, 65 G, 65 R, 74 R; 220/628, 633; 138/106, 108, 109, 158

[56] References Cited

U.S. PATENT DOCUMENTS

| | | | |
|---|---|---|---|
| 3,299,200 | 1/1967 | Sulzer | 174/52 |
| 3,751,574 | 8/1973 | Fisher | 174/52 R |
| 3,778,529 | 12/1973 | Miller | 174/52 PE |
| 4,398,564 | 8/1983 | Young et al. | 138/92 |
| 4,765,375 | 8/1988 | Nakajima | 138/155 |

*Primary Examiner*—Kristine L. Kincaid
*Assistant Examiner*—Michael J. Cornelison
*Attorney, Agent, or Firm*—Barnes & Thornburg

[57] ABSTRACT

A wireway comprises a wireway section having sidewalls providing a wireway interior and first and second ends. The ends include perimetrally extending flanges. Mounting plates are provided for attachment to the flanges. The mounting plates have outer perimetral edges. Each mounting plate has a first mounting foot extending from the outer perimetral edge generally along the wireway section in a first direction to provide a mounting for the wireway.

10 Claims, 3 Drawing Sheets

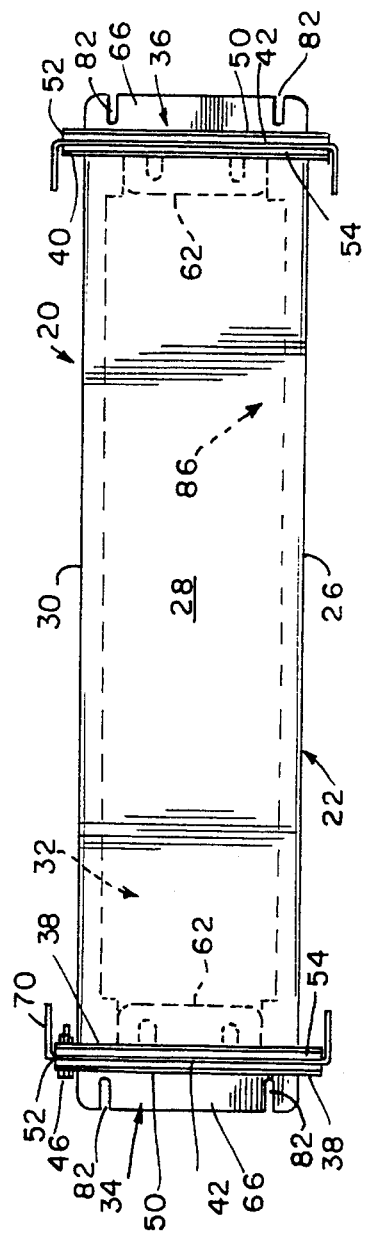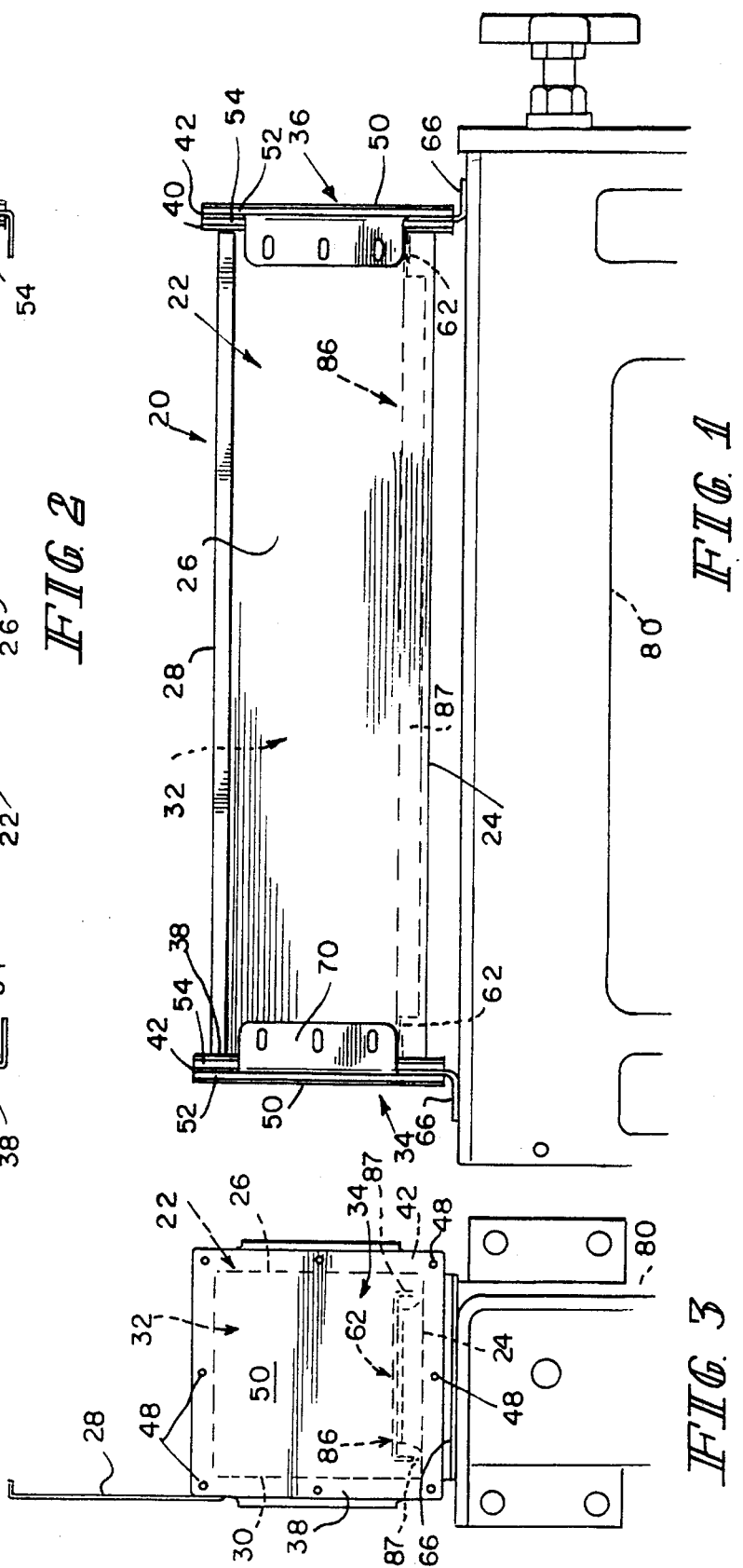

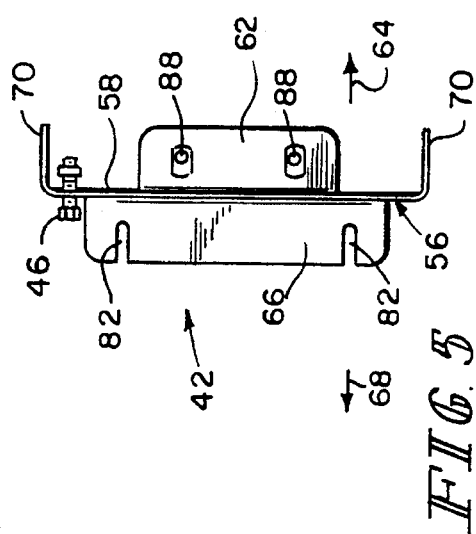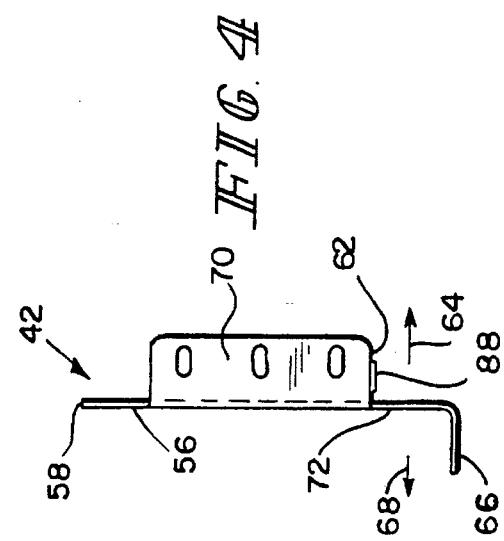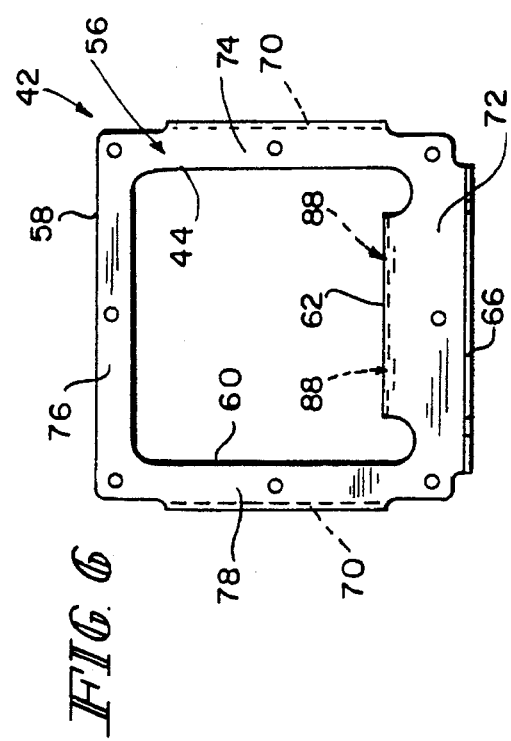

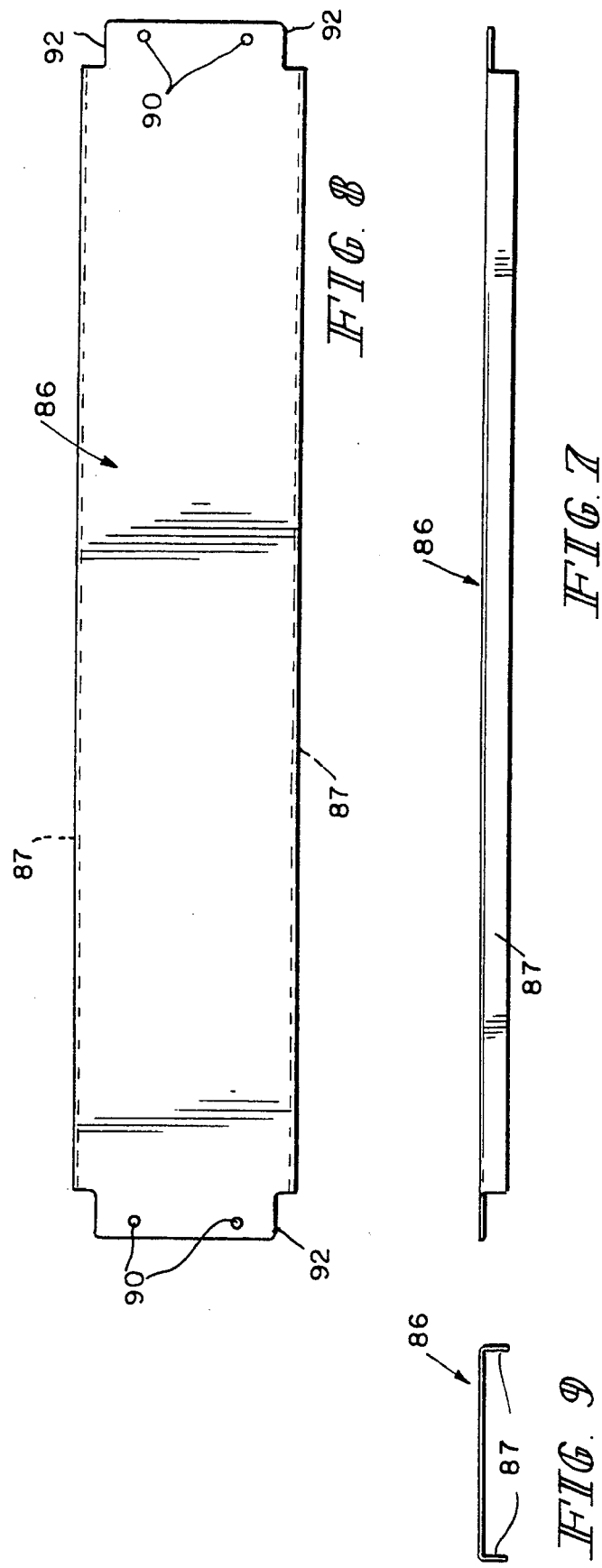

WIREWAY

BACKGROUND OF THE INVENTION

The use of wiring troughs, or wireways, and junction boxes on industrial equipment and machines is commonplace. Many different types of wiring troughs are commercially available. There are, for example, the feed-through wireways available from Hoffman Engineering Company, 900 Ehlen Drive, Anoka, Minn., 55303. These troughs extend among various electrical junction boxes on the industrial equipment or machine. The junction boxes house and protect electrical wiring terminations and occasionally local active, but typically non-heat generating, electrical and electronic functions.

SUMMARY OF THE INVENTION

The present invention permits functions of prior art wiring troughs and junction boxes to be combined, effectively eliminating the need for junction boxes. This reduces the amount of space, "real estate", on the industrial equipment or machine which must be reserved for these functions. In addition, by reducing the required number of elements to house the machine's electrical systems, the cost of construction of the electrical system is reduced.

According to the invention, a wireway comprises a wireway section having at least one sidewall providing a wireway interior and first and second ends. The first end includes a perimetrally extending flange. A mounting plate is provided for attachment to the flange. The mounting plate has an outer perimetral edge and a first mounting foot extending from the outer perimetral edge generally along the wireway section in a first direction to provide a mounting for the wireway.

Illustratively according to the invention, the mounting plate defines an opening permitting access to the interior of the wireway section when the mounting plate is attached to the flange. The opening has an inner perimetral edge. A second mounting foot extends from the inner perimetral edge generally along the wireway section in a second direction opposite to the first.

Further illustratively according to the invention, a third mounting foot extends from the outer perimetral edge generally along the wireway section in one of the first and second directions.

Additionally illustratively according to the invention, a second mounting plate includes an end region for mounting on the second mounting foot. The second mounting plate extends from the second mounting foot into the wireway interior.

Further illustratively according to the invention, the second end of the wireway section comprises a second perimetrally extending flange. A third mounting plate is provided for attachment to the second flange. The third mounting plate has an outer perimetral edge. A fourth mounting foot extends from the outer edge of the third mounting plate generally along the wireway section in the second direction.

Illustratively according to the invention, the third mounting plate defines an opening permitting access to the interior of the wireway section when the third mounting plate is attached to the flange. The third mounting plate has an inner perimetral edge. A fifth mounting foot extends from the inner perimetral edge of the third mounting plate generally along the wireway in the first direction for mounting a second end region of the second mounting plate.

Further illustratively according to the invention, a sixth mounting foot extends from the outer perimetral edge of the third mounting plate generally along the wireway section in one of the first and second directions.

Illustratively according to the invention, the third mounting foot extends in a second direction opposite to the first.

Further illustratively, the third and sixth mounting feet extend in the second and first directions, respectively.

Additionally illustratively, the second mounting plate includes a stiffener extending in the first direction into the wireway interior.

BRIEF DESCRIPTION OF THE DRAWINGS

The invention may best be understood by referring to the following description and accompanying drawings which illustrate the invention. In the drawings:

FIG. 1 illustrates a side elevational view of a wireway constructed according to the present invention, mounted on a machine illustrated in broken lines;

FIG. 2 illustrates a top plan view of the wireway illustrated in FIG. 1;

FIG. 3 illustrates an end elevational view of the wireway of FIGS. 1–2, mounted on a machine illustrated in broken lines;

FIGS. 4–6 illustrate a side elevational view, a top plan view, and an end elevational view, respectively, of a detail of the wireway illustrated in FIGS. 1–3, constructed according to the invention; and, FIGS. 7–9 illustrate a side elevational view, a top plan view, and an end elevational view, respectively, of a detail of the wireway illustrated in FIGS. 1–3, constructed according to the invention.

DESCRIPTION OF AN ILLUSTRATIVE EMBODIMENT

Referring now to FIGS. 1–3, a wireway 20 comprises a wireway section 22 having sidewalls 24, 26, 28, 30 providing a wireway interior 32. Section 22 is generally square in section transverse to its longitudinal extent, as best illustrated in FIG. 3. Section 22 is provided with first and second ends 34, 36, each including a perimetral, outwardly extending flange 38, 40, respectively. A mounting plate 42 is provided for attachment to each flange 38, 40. Referring to FIGS. 4–6 mounting plates 42 are substantially identical, and so only one of them will be described. Mounting plate 42 is provided with a generally rectangular opening 44 permitting access to the interior 32 of the wireway section 22 when the mounting plate 42 is attached to the flange. This attachment is illustratively effected by bolts and nuts 46 passed through aligned openings 48 in a flat plate-like end closure 50, a gasket 52, mounting plate 42, a gasket 54 and flange 38 or 40. The gaskets 52, 54 illustratively are made of sheet cork or other suitable gasket material. End closures 50 can be solid or have holes formed and provided with appropriate fittings for the entry and/or exit of cables, and so on, as required.

The opening 44 is surrounded by a perimetral frame-like region 56 having an outer perimetral edge 58 and an inner perimetral edge 60. A first mounting foot 62 extends from the inner edge 60 of plate 42 generally longitudinally parallel to wireway section 22 in a first direction 64. A second mounting foot 66 extends from the outer edge 58 of plate 42 generally longitudinally along wireway section 22 in a second, opposite direction 68. Third mounting feet 70 extend from the outer edge 58 generally longitudinally along wireway section 22 in one or the other of directions 64, 68, here direction 64. Although feet 62, 66 are illustrated as extending from the same limb 72 of plate 42, it is to be understood that, in normal circumstances they can extend from different limbs 72, 74, 76, 78 of plate 42. The third mounting feet 70 extend from limbs 74 and 78, and it will ordinarily be advantageous for plate 42 to be so constructed that the or each third mounting foot 70 extends from a limb of plate 42 that forms an angle with limb 72. The reason for this will be understood by referring to FIGS. 1 and 3.

In FIGS. 1 and 3, wireway 20 is illustrated mounted upon a machine 80, illustrated in broken lines, by screws which extend through slots 82 provided therefor in feet 66 of mounting plates 42 and into aligned, threaded holes provided therefor in machine 80. This configuration permits other components, such as, for example, other wireway sections 22 terminated by plates 42, to be attached to each other in side-by-side configuration. Other equipment, such as machine 80 safety doors, can also be mounted on feet 70. The illustrated wireway section 22 is provided with a hinged top wall 28 as best illustrated in FIG. 3. This permits access from the top to the interior 32 of wireway section 22 without having to remove an end closure 50.

As best illustrated in FIGS. 1–3 and 7–9, a second mounting plate 86 is mounted in the interior 32 of wireway section 22 between the feet 62 of mounting plates 42. Nuts 88 are provided in feet 62 for this purpose, along with aligned holes 90 in the ends 92 of mounting plate 86. Mounting plate 86 is provided with stiffening edge ribs 87. Mounting plate 86 is useful for mounting, for example, wiring terminations, terminal strips, electrical and electronic components, and the like. Mounting plates 86 are also configured to be mounted between feet 70 to support, for example, wiring terminations, terminal strips, electrical and electronic components, and the like.

What is claimed is:

1. A wireway comprising a wireway section having at least one sidewall providing a wireway interior and first and second ends, the first end including a perimetrally extending flange, a mounting plate for attachment to the flange, the mounting plate having an outer perimetral edge, and a first mounting foot extending from the outer perimetral edge generally along the wireway section in a first direction to provide a mounting for the wireway, the mounting plate defining an opening permitting access to the interior of the wireway section when the mounting plate is attached to the flange, the opening having an inner perimetral edge, and a second mounting foot extending from the inner perimetral edge generally along the wireway section in one of the first direction or a second direction opposite to the first direction.

2. The wireway of claim 1 wherein the second mounting foot extends from the inner perimetral edge generally along the wireway section in said second direction.

3. The wireway of claim 1 or 2 further comprising a third mounting foot extending from the outer perimetral edge generally along the wireway section in one of the first and second directions.

4. The wireway of claim 1 or 2 further comprising a second mounting plate, the second mounting plate including an end region mounted on the second mounting foot, the second mounting plate extending from the second mounting foot into the wireway interior.

5. The wireway of claim 4 wherein the second end of the wireway section comprises a second perimetrally extending flange, a third mounting plate for attachment to the second flange, the third mounting plate having an outer perimetral edge, a fourth mounting foot extending from the outer edge of the third mounting plate generally along the wireway section in the second direction.

6. The wireway of claim 5 wherein the third mounting plate defines an opening permitting access to the interior of the wireway section when the third mounting plate is attached to the second flange, the third mounting plate having an inner perimetral edge, and a fifth mounting foot extending from the inner perimetral edge of the third mounting plate generally along the wireway in the first direction for mounting a second end region of the second mounting plate.

7. The wireway of claim 6 and further comprising a sixth mounting foot extending from the outer perimetral edge of the third mounting plate generally along the wireway section in one of the first and second directions.

8. The wireway of claim 7 wherein the third mounting foot extends in the second direction opposite to the first direction.

9. The wireway of claim 8 wherein the third and sixth mounting feet extend in the second and first directions, respectively.

10. The wireway of claim 4 wherein the second mounting plate includes a stiffener extending into the wireway interior.

* * * * *